Oct. 16, 1934.  K. L. HANSEN  1,976,782
DYNAMO ELECTRIC MACHINE
Filed Jan. 9, 1933   3 Sheets-Sheet 1

Inventor
Klaus L. Hansen
By
Arthur R. Woolfolk
Attorney

Oct. 16, 1934.  K. L. HANSEN  1,976,782
DYNAMO ELECTRIC MACHINE
Filed Jan. 9, 1933  3 Sheets-Sheet 3

Patented Oct. 16, 1934

1,976,782

UNITED STATES PATENT OFFICE 1,976,782

DYNAMO ELECTRIC MACHINE

Klaus L. Hansen, Milwaukee, Wis.

Application January 9, 1933, Serial No. 650,749

18 Claims. (Cl. 171—223)

This invention relates to dynamo electric machines.

This invention is an improvement over that disclosed in my copending application Serial Number 548,513, filed July 3, 1931, for Dynamo electric machines.

Objects of this invention are to provide a dynamo electric machine which is particularly adapted for arc welding purposes, which is a unitary structure and does not employ auxiliary apparatus such as the bulky and expensive reactors, but which is complete in itself, which does not employ an auxiliary exciter, and in which the effect of current impulses in the main circuit are reflected or transmitted back into the field to quicken flux changes in the field to thereby make the dynamo electric machine more responsive to changes in the resistance of the external circuit, the response being more quickly produced and its degree or intensity being automatically proportioned to the amount of change in the resistance of the external circuit, so that the dynamo electric machine has the ability to substantially instantly adapt itself to rapidly varying loads while at the same time does not overshoot but, instead, accurately adjusts itself to the extent or degree of the load.

In arc welding it is well known that the negative resistance of the arc and the rapidly varying resistance, particularly when a drop of molten metal substantially short-circuits the arc, place a demand upon an arc welding generator that is difficult to meet with any degree of stability.

Further objects of this invention are to provide an arc welding generator which is stable even under the most exacting conditions, which does not overshoot or undershoot, which has a remarkably quick recovery, which is wholly automatic in its action, and in which there are no high potentials generated in any circuit that would put the insulation under undue strain although the above noted remarkably quick response and recovery is attained.

An embodiment of the invention is shown in the accompanying drawings, in which:—

Figure 1:
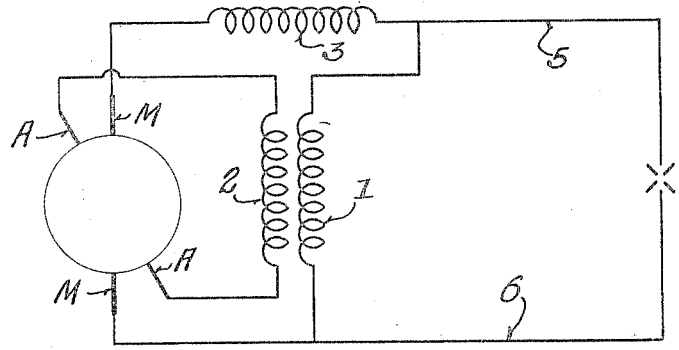
Figure 1 is a diagrammatic view of the connections and circuits employed in the machine, the transient winding, however, being omitted.
Figure 2:
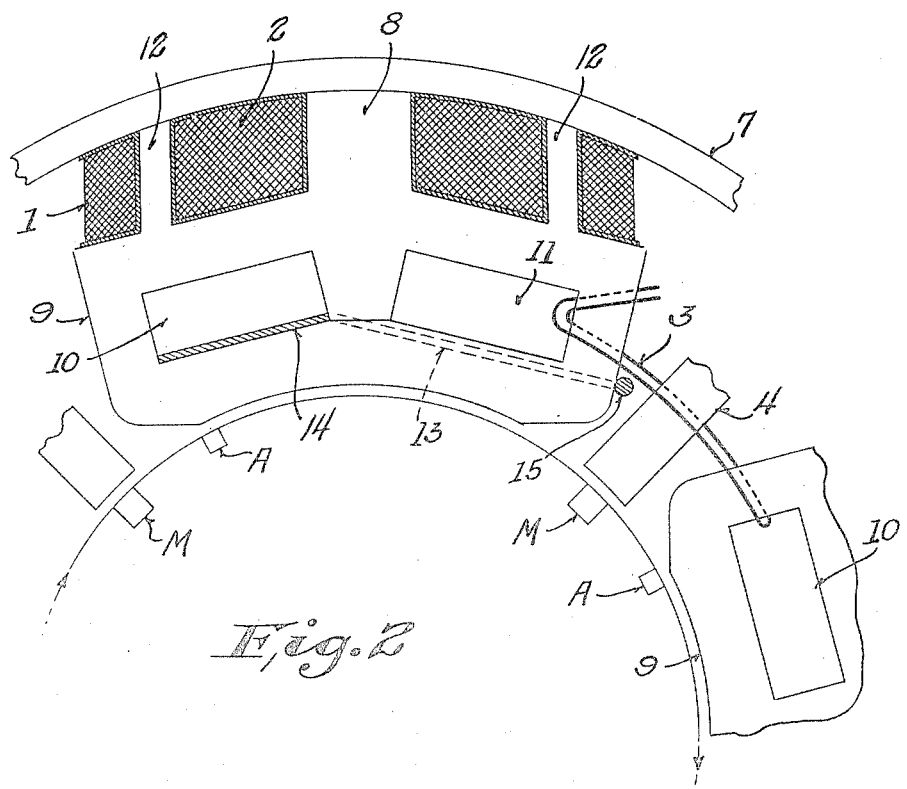
Figure 2 is a schematic view of a portion of the machine showing the windings in place, certain of the windings being in section.
Figure 5:
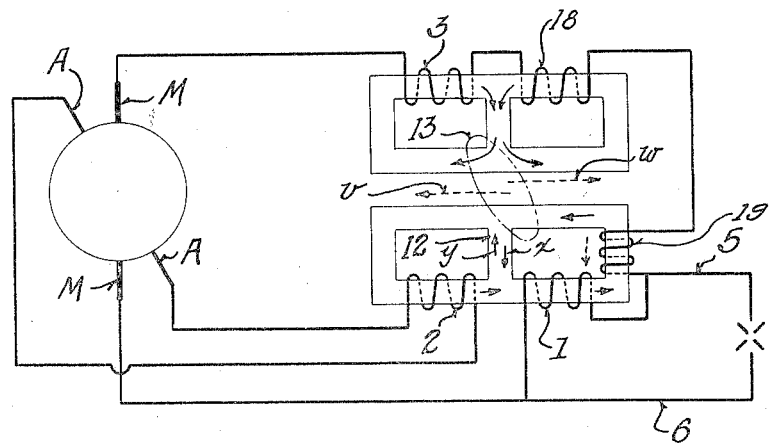
Figure 5 is a diagrammatic view showing the equivalent elements of the machine and showing the interaction of the windings and their magnetic circuits.

Referring to Figures 1, 2 and 5, it will be seen that the machine is provided with a pair of main brushes M and a pair of auxiliary brushes A. The main brushes M are connected to a main shunt coil 1 and the auxiliary brushes A are connected to an auxiliary exciting coil or shunt coil 2, which will hereinafter be referred to as the auxiliary winding. The main circuit for the generator includes, in series with the armature, a reactance increasing winding or stabilizing winding 3, which will hereinafter be referred to as the reactance winding. This reactance winding, as may be seen from Figure 2, encircles the commutating pole 4, although it need not be wound about such pole as a separate winding. This winding is connected in series with the armature and in series with the conductors or load circuits 5 and 6, see Figures 1 and 5, extending from the machine and leading to the welding electrodes.

The mechanical construction of the machine includes a frame 7 to which the poles are bolted or otherwise secured. The poles each comprise a main neck or body portion 8 and an elongated pole shoe 9. The pole shoe 9 is provided with openings 10 and 11. Also, it is to be noted that a pair of magnetic bridges 12 are employed and extend from the pole shoe to the frame 7.

The auxiliary shunt winding 2 is wound directly upon the main neck or body portion 8 of the pole, and the main shunt winding 1 is wound outside of the magnetic bridges 12 so that both shunt windings encircle the neck 8, but the bridge members 12 extend between the main and auxiliary shunt windings. The magnetic flux from these two windings is in the same direction, and preferably the windings are so proportioned that the ampere turns are substantially the same on open circuit.

Figure 3:
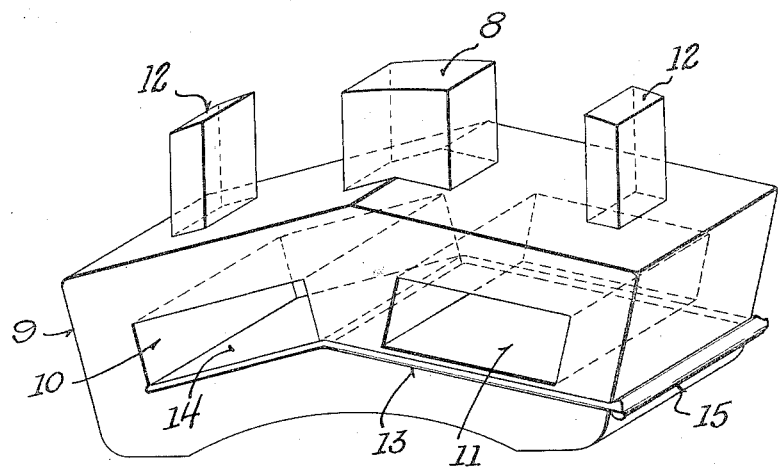
Figure 3 is a perspective view of one of the poles of the machine with all of the windings omitted except the transient winding.
Figure 4:
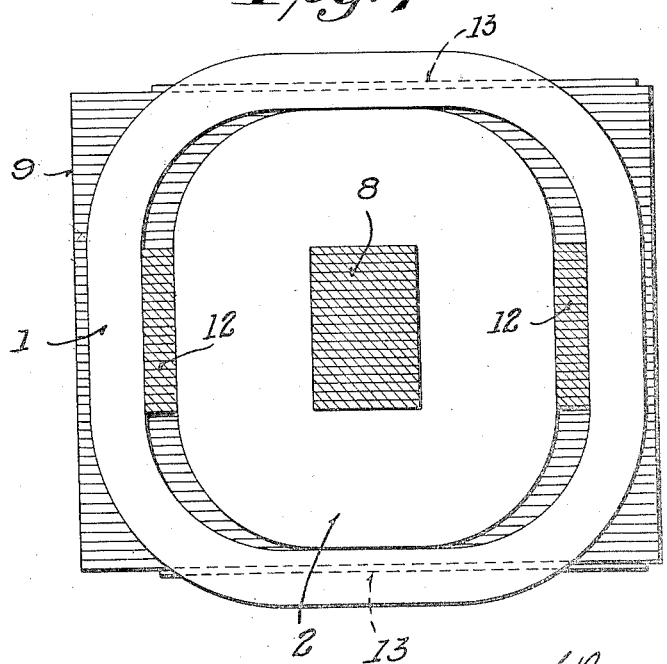
Figure 4 is a sectional view across one of the poles showing the main and auxiliary shunt windings in place.

The stabilizing or reactance winding 3 passes through the opening 10 of one pole shoe and through the opening 11 of the next pole shoe, as shown most clearly in Figure 2. This construction is somewhat similar to that described and illustrated in my Patent No. 1,418,707 of June 6, 1922 for Constant current generator for arc welding, and is very similar to that described in my later Patent No. 1,711,844 of May 7, 1929 for Dynamo electric machines. These apertures are formed, as stated, in the pole shoes themselves to secure a large value for the reactance or stabilizing winding and also to secure a pronounced effect upon the distribution of flux in the pole shoes. Each pole shoe, it will be seen, serves as a common magnetic path for the stabilizing flux of the reactance producing or stabilizing winding, and the flux due to armature cross-magnetization. From Figure 3 it is apparent that the axial length of the neck 8 of the pole is considerably shorter than the axial length of the pole shoe 9.

Correct commutation can be secured by using a relatively high number of bars so that the voltage between adjacent commutator bars is reduced to a relatively low value. The main brushes M are located in proper relation to the commutating poles 4 to secure correct commutation without sparking at the outer bars. The auxiliary brushes which are spaced ahead from the main brushes, that is to say, in the direction of the rotation of the armature, have a very high contact resistance and can, without commutation difficulties, handle a much higher voltage per bar than is ever reached in these generators, which, as a matter of fact, is usually low. Further, it is clear that the slight bevelling of the pole shoes 9 aids in correct commutation at the auxiliary brushes.

A transient or short-circuited winding, indicated generally at 13 in Figures 2 and 5, is employed and forms a link between the stabilizing winding 3 and the field windings. This transient winding may consist of a flat strip 14 laid in the slot 10 and connected to a transverse bar 15 positioned outside of the pole shoe, as shown in Figure 2. These parts are all firmly united and form a unitary one-turn winding.

Referring to the diagrammatic showing of Figure 5, it will be seen that this figure is not an actual diagram of the circuits, but is drawn to show the separate elements acting in the automatic control of the machine, the separation of the armature cross-magnetizing and demagnetizing turns, respectively indicated at 18 and 19, for example, being for convenience only. Considering Figures 2 and 5 it is apparent that in the absence of saturation there is no mutual induction between the stabilizing winding and the two shunt windings. They have been accordingly shown in Figure 5 as having separate magnetic circuits. It is apparent that the flux passing in one direction through the extreme right hand portion of a pole, as viewed in Figure 2, passes into the extreme left hand portion of the next adjacent pole, and, consequently, so far as the winding 3 is concerned, does not constitute an interlinking flux.

The two shunt coils 1 and 2 are excited in the same direction and unless the main pole body is saturated, little flux passes through the magnetic bridge on open circuit. What flux there is, passes through in the direction indicated by the arrow $x$, in Figure 5. On short-circuit the magnetomotive force of the main field winding 1 disappears and an opposing magnetomotive force of armature demagnetization appears. Now a considerable amount of flux passes across the bridge in the direction of the arrow $y$, that is, instead of reducing the flux in the main pole neck 8 (see Figure 2), which flux interlinks with the auxiliary field winding, most of it on short-circuit is diverted through the bridge 12. The result is that the energy stored in the auxiliary field changes but very little as the terminal voltage varies up and down, thereby avoiding the generation of high potentials in this winding, as the energy stored in this field is scarcely varied at all.

The short-circuited winding or transient winding 13 makes the machine still faster in response to variations in external resistance. When the current in the stabilizing winding increases rapidly, the current will flow in the short-circuited winding assisting in reducing the field flux, as indicated by the arrow $w$ in Figure 5. Under these conditions flux passes through the bridge 12 in the direction indicated by the arrow $y$ and consequently the voltage at the terminals of the machine is reduced.

When the current in the stabilizing winding is decreasing rapidly, the transient current in the short-circuited winding or transient winding assists in building up the main flux, the flux from the transient winding being then in the direction indicated by the arrow $v$ in Figure 5. In this method of utilizing impulses from the arc circuit to speed up changes in the field, there are no high potentials generated in any circuit at any time which might put undue strain on the insulation.

As described in considerable detail in my later Patent No. 1,718,844 noted hereinabove, the auxiliary shunt winding 2 has a substantially constant current acting like a separately excited winding, the shunt winding 1 acting in its normal capacity, and the reactance winding or stabilizing winding 3 being in series with the load circuit acts to greatly increase the reactance and also has a pronounced effect upon the distribution of flux in the pole shoe.

This invention greatly lessens overshooting without the use of any auxiliary apparatus whatsoever and without any loss in efficiency. The actual results of an oscillographic test of the machine has been plotted to scale in Figure 6. These curves show the action of a 300 ampere machine as it passes from open circuit to short-circuit and back again to open circuit.

Figure 6:
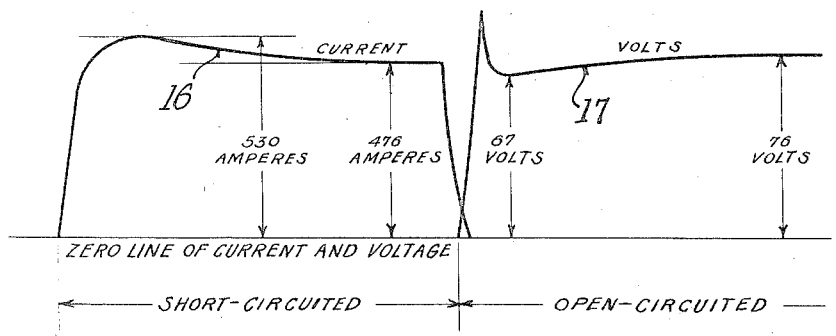
Figure 6 is a view showing an oscillographic record of current and voltage of a 300 ampere machine in passing from open circuit to short-circuit and back to open circuit.

Referring to Figure 6 it will be seen that the curve 16 represents the current flow in the external circuit during short-circuit. The machine was suddenly short-circuited and the current rose to 530 amperes and again quickly dropped to a steady state of 476 amperes on this dead short-circuit. The external circuit was then suddenly opened and the voltage at the terminals followed the curve 17. This voltage substantially instantly rose to approximately its correct open circuit value, first rising to a very slight peak, as shown in Figure 6, slightly dropping and instantly recovering and staying at the normal open circuit voltage of 76 volts for which this machine was designed.

The abscissa in each of these curves is time and it may be interesting to note that the entire horizontal measurement under the voltage curve represents only a small fraction of a second.

It will be seen that the machine does not overshoot and is remarkably stable, while at the same time being remarkably fast in its automatic recovery and adjustment to the widely varying loads or widely varying resistance of the external circuit. These results are obtained without the use of any auxiliary apparatus whatsoever and through the inherent characteristics of the unitary dynamo electric machine itself.

It is to be noted further that the dynamo electric machine is easy to construct and does not require any unusual machine shop practices for its construction. The assembly is easy to follow and it may be made with comparatively small expense, although it possesses all of the desirable characteristics hereinbefore enumerated.

Although this invention has been described in considerable detail, it is to be understood that such description is intended as illustrative rather than limiting, as the invention may be variously embodied and is to be interpreted as claimed.

I claim:

1. A dynamo electric machine having a main load circuit and comprising a field structure having field poles and a field frame, an armature, pairs of field windings other than series windings in cumulative relation on said poles, magnetic bridges between the windings of said pairs of field windings and extending between the poles and the field frame, and a reactance winding including a portion of said field poles and connected in effective series in said main circuit and responsive to load variations.

2. A dynamo electric machine having a main load circuit and comprising a field structure having field poles and a field frame, an armature, pairs of field windings other than series windings in cumulative relation on said poles, magnetic bridges between the windings of said pairs of field windings and extending between the poles and the field frame, a reactance winding including a portion of said field poles and connected in effective series in said main circuit and responsive to load variations, and a transient winding carried by said field poles and interlinking the fluxes produced by both said field windings and said reactance winding.

3. A dynamo electric machine comprising an armature, a field structure having a field frame and field poles provided with pairs of windings other than series windings in cumulative relation for producing a main magnetic flux, magnetic bridges between the windings of said pairs of windings and extending between the poles and the field frame, a reactance winding for producing a magnetic flux, said reactance winding being connected in effective series with the main load and responsive to load variations, and a winding interlinking both fluxes.

4. A dynamo electric machine comprising an armature, a field structure having a field frame and field poles provided with pairs of windings other than series windings in cumulative relation for producing a main magnetic flux, magnetic bridges between the windings of said pairs of windings and extending between the poles and the field frame, a reactance winding for producing a magnetic flux responsive to load variations and connected in effective series with the main load, and a winding interlinking both fluxes, said last mentioned winding having current therein only when the current in said reactance winding is varying.

5. A dynamo electric machine comprising an armature, a field structure having a field frame and field poles provided with pairs of windings other than series windings in cumulative relation for producing a main magnetic flux, a magnetic bridge between the windings of each pair and extending between the poles and the field frame, a reactance winding for producing a magnetic flux responsive to load variations and connected in effective series with the load, and a transient winding inductively related to said reactance winding and opposing said main flux when said load is increasing and aiding said main flux when said load is decreasing.

6. A dynamo electric machine comprising an armature, a field structure having a field frame and field poles provided with pairs of windings other than series windings in cumulative relation for producing a main magnetic flux, a magnetic bridge between the windings of each pair and extending between the poles and the field frame, a reactance winding for producing a magnetic flux responsive to load variations and connected in effective series with the load, and a transient winding inductively related to said reactance winding and opposing said main flux when said load is increasing and aiding said main flux when said load is decreasing, all of said windings forming a unitary structure with the field structure of said dynamo electric machine.

7. A dynamo electric machine comprising a field structure having a field frame and field poles, an armature provided with a commutator, main and auxiliary brushes bearing on said commutator, a main field winding and an auxiliary field winding on said field poles in cumulative relation and respectively supplied from said main and auxiliary brushes, and a magnetic bridge between said main and auxiliary windings extending between a field pole and said field frame.

8. A dynamo electric machine comprising a field structure having a field frame and field poles, an armature provided with a commutator, main and auxiliary brushes bearing on said commutator, main field windings and auxiliary field windings on said field poles in cumulative relation and respectively supplied from said main and auxiliary brushes, a magnetic bridge between said main and auxiliary windings and extending between a field pole and said field frame, and a reactance winding responsive to load variations and having its magnetic circuit including a portion of said field poles, said reactance winding being connected in effective series with the load.

9. A dynamo electric machine comprising a field structure having a field frame and field poles, an armature provided with a commutator, main and auxiliary brushes bearing on said commutator, main field windings and auxiliary field windings on said field poles in cumulative relation and respectively supplied from said main and auxiliary brushes, and a reactance winding responsive to load variations and connected in effective series with the load and having its magnetic circuit including a portion of said field poles, said dynamo electric machine having magnetic circuits substantially preventing a change of flux through said auxiliary windings when a change of flux due to said reactance winding occurs.

10. A dynamo electric machine comprising a field structure having a field frame and field poles, an armature provided with a commutator, main and auxiliary brushes bearing on said commutator, main field windings and auxiliary field windings on said field poles in cumulative relation and respectively supplied from said main and auxiliary brushes, and a reactance winding responsive to load variations and connected in effective series with the load and having its magnetic circuit including a portion of said field poles, a transient winding through which the flux from said field poles pass, said transient winding being inductively coupled to said reactance winding, said dynamo electric machine having magnetic circuits substantially preventing a change of flux through said auxiliary windings when a change of flux due to said reactance winding occurs.

11. A dynamo electric machine comprising a field structure having a field frame and field poles provided with necks and pole shoes, said pole shoes having apertures extending transversely therethrough, an armature, pairs of field windings on the necks of said field poles in cumulative relation, magnetic bridges between the windings of said pairs of windings extending between said pole shoes and said field frame, means for maintaining the magnetomotive force for one winding of each pair substantially constant, and a reactance winding threaded through the apertures of said pole shoes and connected in effective series with the load.

12. A dynamo electric machine comprising a field structure having a field frame and field poles provided with necks and pole shoes, said pole shoes having transverse apertures therethrough spaced on opposite sides of the center line of said necks, an armature, pairs of field windings on the necks of said field poles in cumulative relation, magnetic bridges between the windings of said pairs of windings and extending between the shoes of said poles and said field frame, means for maintaining the magnetomotive force for one winding of each pair substantially constant, a reactance winding threaded through the apertures of said pole shoes and connected in effective series with the load, and a transient winding through which the flux from said field poles pass, said transient winding being inductively coupled to said reactance winding.

13. A dynamo electric machine comprising a field structure having a field frame and field poles provided with necks and pole shoes, said pole shoes having transverse apertures therethrough spaced on opposite sides of the center line of said necks, an armature, an auxiliary and a main field winding in cumulative relation on the neck of each pole, a magnetic bridge between each auxiliary and main winding and extending between the shoes of said poles and said frame, a reactance winding threaded through the apertures in said pole shoes and connected in effective series with the load, and a transient winding carried by each field pole through which the flux from the field pole passes, said transient winding being inductively coupled to said reactance winding.

14. A dynamo electric machine comprising a field structure having a field frame and field poles provided with necks and pole shoes, said pole shoes having transverse apertures therethrough spaced on opposite sides of the center line of said necks, an armature, an auxiliary and a main field winding in cumulative relation on the neck of each pole, a magnetic bridge between each auxiliary and main winding and extending between the shoes of said poles and said field frame, a reactance winding threaded through the apertures in said pole shoes, and a transient winding carried by each field pole through which the flux from the field pole passes, each transient winding being interlinked by the flux from its corresponding field pole and the flux produced by said reactance winding.

15. A dynamo electric machine comprising a field structure having a field frame and field poles provided with necks and pole shoes, said pole shoes having transverse apertures therethrough, an armature, an auxiliary field winding directly wound on each field pole, a main field winding wound around each auxiliary field winding, said windings being in cumulative relation, a magnetic bridge between each auxiliary and main field winding and extending between the shoes of said poles and said field frame, and a reactance winding threaded through the apertures in said pole shoes.

16. A dynamo electric machine comprising a field structure having a field frame and field poles provided with necks and pole shoes, said pole shoes having transverse apertures therethrough, an armature, an auxiliary field winding directly wound on each field pole, a main field winding wound around each auxiliary field winding, said windings being in cumulative relation, a magnetic bridge between each auxiliary and main field winding and extending between the shoes of said poles and said field frame, a reactance winding threaded through the apertures in said pole shoes, and a transient winding interlinking the flux produced by said transient winding and the flux from said field poles.

17. A dynamo electric machine comprising a field structure having a field frame and field poles, an armature, pairs of field windings in cumulative relation, and magnetic bridges between the windings of said pairs of field windings and extending between said poles and said field frame.

18. A dynamo electric machine comprising a field structure having a field frame and field poles, an armature, pairs of field windings, in cumulative relation, and magnetic bridges between the windings of said pairs of field windings and extending between said poles and said field frame, the voltage at one of said windings being maintained at a substantially constant value, and the voltage at the other of said windings being responsive to changes in the terminal voltage of the machine.

KLAUS L. HANSEN.